US005590610A

United States Patent [19]

Sanbonmatsu

[11] Patent Number: 5,590,610

[45] Date of Patent: Jan. 7, 1997

[54] WASTE BURNING BOILER

[76] Inventor: Yutaka Sanbonmatsu, 32-20 Negishidai 7-chome, Asaka-shi, Saitama-ken, Japan

[21] Appl. No.: 315,712

[22] Filed: Sep. 30, 1994

[30] Foreign Application Priority Data

| | | | |
|---|---|---|---|
| Mar. 8, 1994 | [JP] | Japan | 6-065506 |
| Mar. 8, 1994 | [JP] | Japan | 6-065507 |

[51] Int. Cl.[6] ........ F23B 7/00

[52] U.S. Cl. ........ 110/234; 110/245; 110/258; 122/2

[58] Field of Search ........ 110/234, 244, 110/245, 258, 314; 122/2

[56] References Cited

U.S. PATENT DOCUMENTS

| | | | |
|---|---|---|---|
| 1,720,365 | 7/1929 | Klingbeil | 122/2 |
| 4,909,162 | 3/1990 | Vollhardt | 110/234 |
| 5,103,745 | 4/1992 | Harloff | 110/246 |
| 5,259,342 | 11/1993 | Brady et al. | 110/234 X |
| 5,408,942 | 4/1995 | Young | 110/244 X |

*Primary Examiner*—Henry A. Bennett
*Assistant Examiner*—Susanne C. Tinker
*Attorney, Agent, or Firm*—Marshall & Melhorn

[57] ABSTRACT

The waste burning boiler comprises a cylindrical outer wall, a cylindrical inner wall consisting of a plurality of vertical water pipes having the gaps therebetween closed by plate members. The plate members are provided with a plurality of holes communicating the annular chamber between the inner and outer walls with the combustion chamber defined inside the inner wall. Compressed air is introduced into the annular chamber, and is blown into the combustion chamber from these small holes. The air blown from these holes provide a sufficient amount of oxygen for combustion, and raises the combustion temperature. Additionally, the air flow from the small holes provide a favorable stirring effect which improves the transfer of heat produced by combustion to the water pipes. Also, because the air blown into the combustion chamber is heated by the heat produced by the combustion in the combustion chamber, the air blown into the combustion chamber would not significantly lower the prevailing temperature in the combustion chamber. The annular chamber additionally serves as an insulator for keeping the outer wall at a relatively low temperature which is desirable not only for simplifying the outer wall design but also for improving the overall thermal efficiency of the boiler.

8 Claims, 2 Drawing Sheets

WASTE BURNING BOILER

TECHNICAL FIELD

The present invention relates to a boiler for heating water by using heat produced by incinerating trash, wood scraps and other waste materials.

BACKGROUND OF THE INVENTION

Conventionally, wood scraps, waste paper, used plastics and other waste materials have been simply incinerated in an incinerator for disposal. Because the combustion of waste materials in a normal incinerator is not very efficient, and a large amount of smoke is produced due to insufficient combustion, it has been a common practice to install an auxiliary burner in the passage of smoke for completely burning the smoke.

As an effort to save energy and resources, there has been a desire to develop a boiler which can use the heat produced by burning waste materials for useful purpose. However, the temperature achieved in a normal incinerator is so low as compared to an oil burning boiler that a sufficient amount of heat cannot be recovered from the given amount of waste materials. In other words, the conventional incinerator incorporated with a boiler was so inefficient that the concept of waste burning boiler has never received any wide acceptance.

One solution to this problem is to raise the combustion temperature, and improve the efficiency of heat transfer between the combustion chamber and the water pipes. It is therefore conceivable to install an auxiliary burner inside a main combustion chamber to improve the combustion efficiency and raise the combustion temperature of the main combustion chamber. However, due to increased complexity of the burner structure, and substantial difficulty in adapting the burner to variations in the composition of the fuel consisting of waste materials, this solution cannot produce any satisfactory results.

It has also been proposed to crush the waste materials and form them into solid fuel blocks of a desired size by using a linking agent for the purpose of raising the combustion temperature. However, the cost required for processing the fuel more than offset what might be gained by the use of such a form of fuel. Furthermore, a desired high combustion temperature cannot be obtained without proper burner design, such as installing an auxiliary burner in the main combustion chamber. Thus, practically, this proposal does not offer any satisfactory solution to the problem.

BRIEF SUMMARY OF THE INVENTION

In view of such problems of the prior art, a primary object of the present invention is to provide a waste burning boiler which does not require any complex burner design or any special processing of the fuel.

A second object of the present invention is to provide a waste burning boiler which can achieve a high combustion temperature, and an efficient heat transfer.

A third object of the present invention is to provide a waste burning boiler which is economical to fabricate, and durable in use.

These and other objects of the present invention can be accomplished by providing a waste burning boiler, comprising: a substantially enclosed outer wall; a plurality of water pipes extending between an inlet header and an outlet header inside the outer wall in the manner of a cage having an open top and an open bottom, and defining a combustion chamber therein and an annular chamber between the water pipes and the outer wall; a fuel inlet provided in the outer wall so as to communicate with the combustion chamber for charging waste material to be burnt into the combustion chamber; an exhaust outlet provided in the outer wall for expelling exhaust gas from the combustion chamber; an ash outlet provided in a lower part of the outer wall for removing ash from the combustion chamber; means for supplying pressurized air into the annular chamber; means for injecting air conducted from the annular chamber into the combustion chamber from a plurality of nozzles; water supply means for supplying water into the inlet header; and steam delivery means for forwarding steam and/or hot water produced in the outlet header to an external user.

Thus, the air blown from the nozzles provide a sufficient amount of oxygen for combustion, and raises the combustion temperature. Additionally, the air flow from the nozzles provide a favorable stirring effect which improves the transfer of heat produced by combustion to the water pipes. Also, because the air blown into the combustion chamber is heated by the heat produced by the combustion in the combustion chamber, the air blown into the combustion chamber would not significantly lower the prevailing temperature in the combustion chamber. The annular chamber additionally serves as an insulator for keeping the outer wall at a relatively low temperature which is desirable not only for simplifying the outer wall design but also for improving the overall thermal efficiency of the boiler.

In particular, by arranging the water pipes in mutually spaced relationship, and closing the gaps defined between the water pipes with plate members, the annular chamber can be placed under a substantially enclosed condition, and both the outer wall insulation and the preheating of the air blown into the combustion chamber can be accomplished in a favorable fashion. In particular, by forming a plurality of holes in the plate members to blow air into the combustion chamber, it is possible to flow air flow uniformly into the combustion chamber in a simple manner.

According to a preferred embodiment of the present invention, the outer wall consists of a substantially cylindrical wall, and the water pipes and the plate members jointly define a substantially enclosed cylindrical inner wall.

The exhaust outlet preferably comprises depressurizing means for drawing exhaust gas out of the combustion chamber. Thus, exhaust gas may be efficiently drawn out of the combustion chamber for efficient combustion, and the combustion chamber may be maintained at a slightly negative pressure condition so that the fuel inlet may be kept open without causing any fire flames blowing out from the fuel inlet. The depressurizing means may comprise an ejector which is powered by a flow of pressurized air produced by the pressurized air supplying means for supplying pressurized air into the annular chamber.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
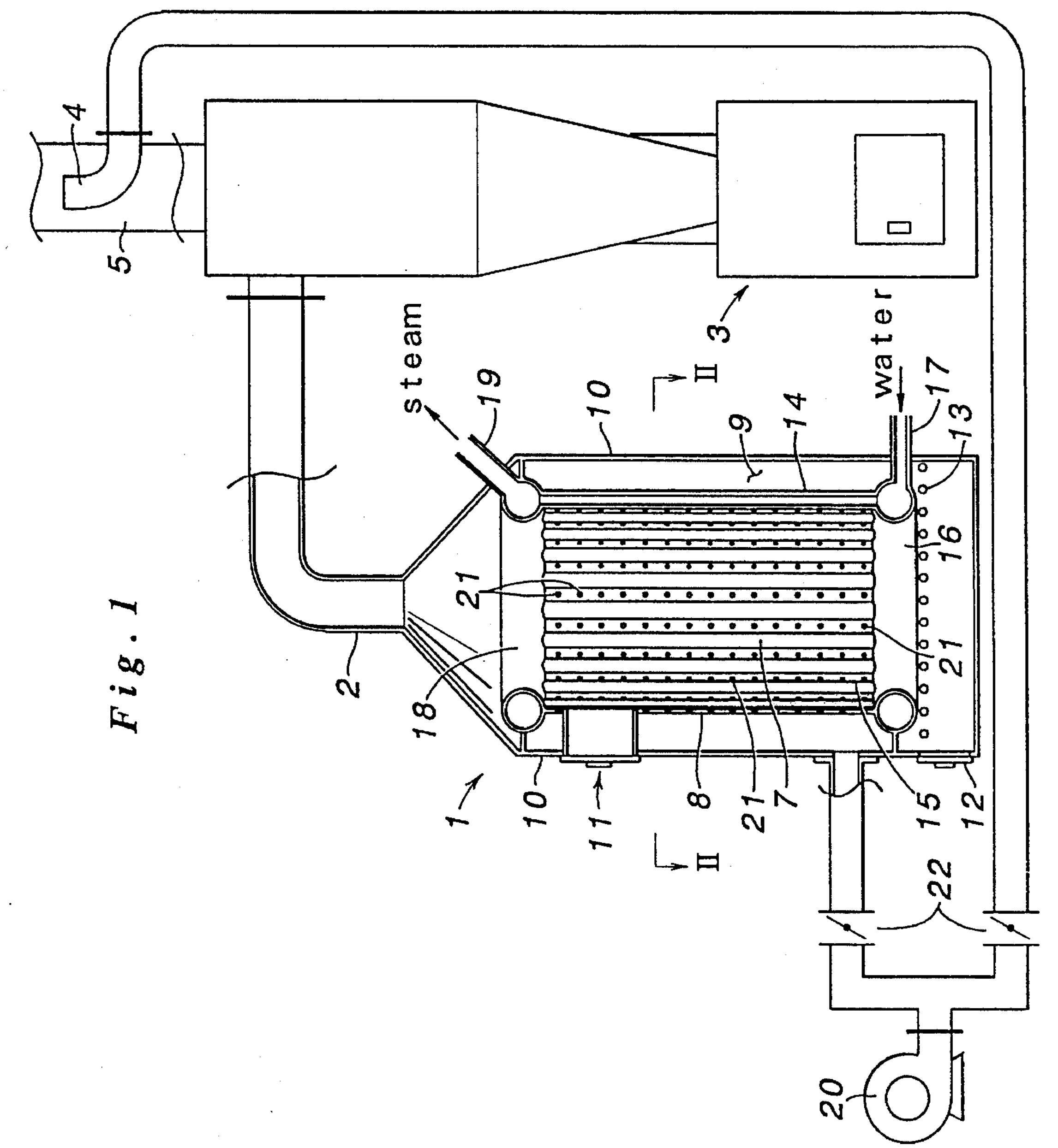
FIG. 1 is a schematic view of a preferred embodiment of the waste burning boiler according to the present invention.

FIG. 1 is a schematic view generally showing a preferred embodiment of the waste burning boiler according to the present invention, with a part thereof shown in a longitudinal section. This boiler comprises a combustion furnace main body 1, and a cyclone dust collector 3 which is connected to the combustion furnace main body 1 via an exhaust pipe 2. The dust collector 3 is provided with an ejector 4 which produces a negative pressure in the exhaust pipe by using the flow of compressed air from an air blower 20 to draw the combustion gas and lead it to a chimney 5.

The combustion furnace main body 1 comprises a cylindrical inner wall 8 defining an internal combustion chamber 7 for burning waste materials, and a cylindrical outer wall 10 coaxially surrounding the inner wall 8 and defining an annular chamber 9 between the inner wall 8 and the outer wall 10. The upper and lower ends of the inner wall 8 are open as illustrated in FIG. 1. An upper portion of the outer wall 10 is provided with a waste inlet 11 communicating with the internal combustion chamber 7 for charging fuel or waste material into the internal combustion chamber 7, and a lower part of the outer wall 10 is provided with an ash outlet 12 for taking out ash produced by the combustion inside the combustion chamber 7. A grid 13 is placed under the open lower end of the inner wall 8 for receiving the fuel or the waste materials charged from the waste inlet 11.

Figure 2:
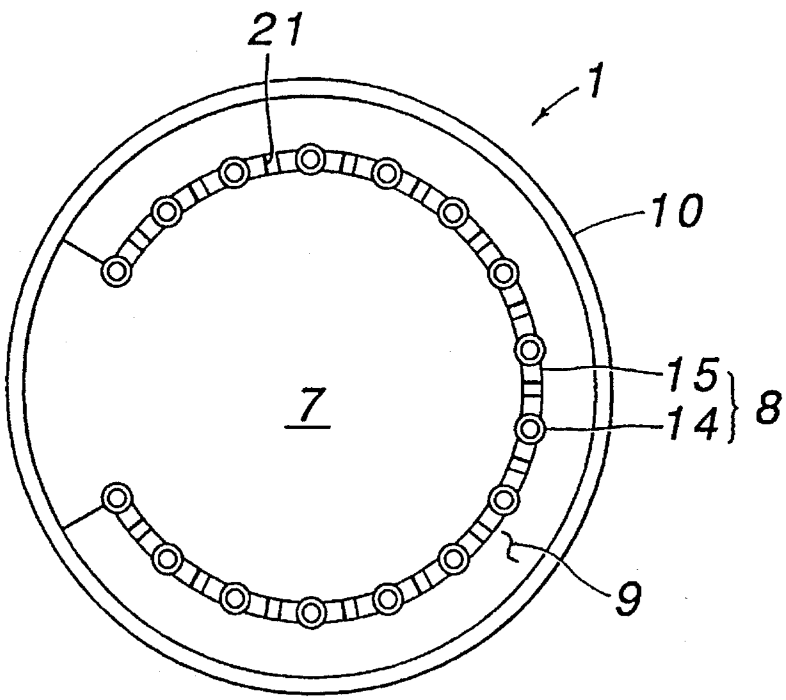
FIG. 2 is a sectional view taken along line II—II of FIG. 1.

Referring to both FIGS. 1 and 2, the inner wall 8 comprises a plurality of water pipes 14 extending in the axial direction in mutually parallel and spaced relationship in the manner of a cage, and their lower and upper ends are connected to annular headers 17 and 18. The water pipes 14 are connected to one other by plate members 15 which substantially close the gaps defined between adjacent water pipes 14. The lower header 17 is connected to a water source not shown in the drawing via a conduit 17 while the upper header 18 is connected to a user of produced steam or water via an outlet conduit 19.

The annular chamber 9 is connected to an air blower 20 via a damper 22 for controllably supplying a flow of pressurized air into the annular chamber 9. The plate members 15 connecting the water pipes 14 are each provided with a plurality of holes 21 at regular interval to supply the air from the annular chamber 9 into the combustion chamber 7. The blower 20 is also connected to the ejector 4 for producing a negative pressure in the downstream region of the exhaust pipe as discussed earlier.

Now the operation of this embodiment is described in the following.

Figure 3:
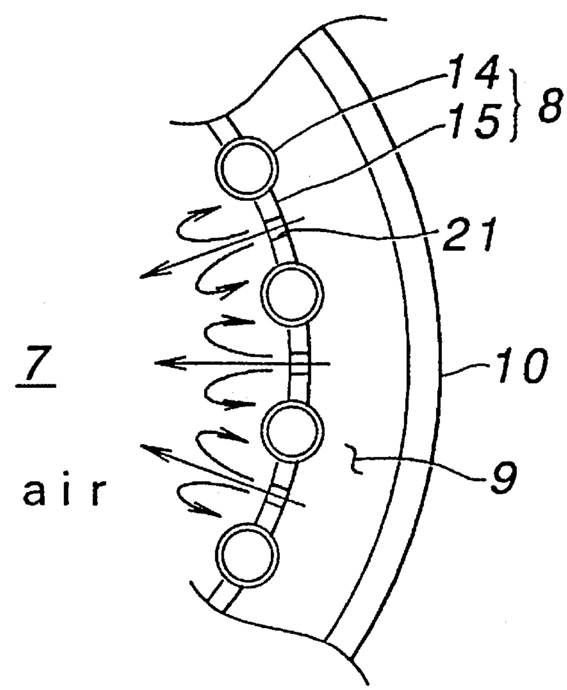
FIG. 3 is an enlarge view of a part of FIG. 2 showing the flow of air in the combustion chamber.

First of all, combustion is started in the combustion chamber according to a prescribed procedure, and pressurized air is introduced by the blower 20 into the annular chamber 9. As a result, the compressed air is evenly blown into the combustion chamber 7 via the small holes 21 provided in the plate members 15 (FIG. 3). This air flow allows the air in the annular chamber 9 to be continually renewed, and provides a favorable heat insulation between the inner and outer walls 8 and 10 on the one hand. Furthermore, the heat transferred to the pressurized air in the annular chamber 9 is returned back to the combustion chamber 7 carried by the air flow from the small holes 21, and contributes to the raising of the temperature in the combustion chamber 7. The temperature of the air blown into the combustion chamber from the small holes 21 is preferably in the order of 100° C. or higher. Also, because the air is evenly blown into the combustion chamber 7 from all sides, not only oxygen is sufficiently supplied for combustion but also the resulting air flow inside the combustion chamber 7 mixes the contents in the combustion chamber with air, and a highly efficient combustion can be maintained in the combustion chamber 7.

The air temperature near the water tubes 14 and the plate members 15 is close to the water temperature in the water tubes 14, and progressively increases as the distance from these parts increases. However, by providing small holes 21 in the plate members 15, the part of the air located near the water tubes 14 and the plate members 15 can be blown away and stirred by the air introduced from these holes 21, and can expose the water tubes 14 and the plate members 15 to the air of relatively high temperature as illustrated in FIG. 3. This greatly contributes to the improvement of heat transfer. Additionally, the continuous turbulent air flow along the surfaces of the water pipes 14 and the plate members 15 prevents deposition of ash, scale and other undesirable substances on their surfaces.

In addition to these factors, because this boiler allows the radiation heat from combustion to be directly directed onto the water tubes 14 and the plate members 15, a favorable heat transfer comparable to that of an oil burning boiler can be achieved.

The exhaust gas produced by the combustion in the combustion chamber 7 is conducted to the cyclone dust collector 3 via the exhaust pipe 2, drawn by the negative pressure produced by the ejector 4, and is expelled from the chimney 5. Because of a slightly negative pressure produced by the ejector in the upstream region of the combustion chamber 7, the chance of blowing out fire flames from the fuel inlet 11 can be eliminated even when it is kept open. Therefore, fuel or waste materials can be charged into the combustion chamber 7 at any time.

The water is supplied to the water tubes 14 via the annular header 16, and the steam or the hot water produced by the combustion heat is forwarded to the user not shown in the drawings via the header 18 and the outlet conduit 19.

In this embodiment, an annular chamber was defined between the inner cylindrical wall and the outer cylindrical wall, and air was blown into the central combustion chamber from a plurality of holes provided in the inner wall via the annular chamber. However, the inner wall may be defined by the water pipes arranged in mutually spaced relationship although it is more preferably to use a substantially closed inner wall which may be accomplished either by closing the gaps between the water pipes with plate members or by arranging the water pipes close to one another without defining any gaps therebetween. Also, the air may be blown into the combustion chamber in a number of different ways. For instance, nozzles may be provided in a lower part of the combustion chamber for impinging air onto the surfaces of the water tubes and the plate members. Alternatively, the pipes may be extended inside the combustion chamber to provide the air nozzles opposite to the water tubes and the plate members inside the combustion chamber.

According to the waste burning boiler of the present invention, because pressurized air is continually blown into the combustion chamber from a large number of small nozzles opening into the combustion chamber, and continually stirs the air near the water pipes, a favorable and efficient combustion can be maintained owing to the plentiful supply of oxygen to all parts of the fuel and a favorable heat transfer between the combustion gas and the water pipes. By providing a substantially closed annular chamber surrounding the combustion chamber, and using the annular chamber as a plenum chamber for the air flow directed into the combustion chamber, a favorable insulation of the boiler and a favorable recycling of heat can be accomplished, and the combustion temperature can be thereby raised. Therefore, this boiler can burn waste materials having a relatively high moisture content without any problem.

Conventionally, a waste burning boiler typically burnt waste materials by supplying twice the theoretically required amount of air. However, according to the waste burning boiler of the present invention, it is possible to maintain combustion by supplying approximately five times the theoretically required amount of air, and the combustion temperature can be raised to a substantially higher level as can be indicated by the white color of the flames. The high combustion temperature along with the stirring effect of the air flow issuing from the small holes can improve the efficiency of the waste burning boiler to a level comparable to that of an oil burning boiler.

Although the present invention has been described in terms of a preferred embodiment thereof, it is obvious to a person skilled in the art that various alterations and modifications are possible without departing from the scope of the present invention which is set forth in the appended claims.

What we claim is:

1. A waste burning boiler, comprising:

a substantially enclosed outer wall;

a plurality of water pipes in a mutually spaced relationship extending between an inlet header and an outlet header inside said outer wall in the manner of a cage having an open top and an open bottom, and defining a combustion chamber therein and an annular chamber between said water pipes and said outer wall, the gaps between said water pipes being substantially closed by a plurality of plate members;

a fuel inlet provided in said outer wall so as to communicate with said combustion chamber for charging waste material to be burnt into said combustion chamber;

an exhaust outlet provided in said outer wall for expelling exhaust gas from said combustion chamber;

an ash outlet provided in a lower part of said outer wall for removing ash from said combustion chamber;

means for supplying pressurized air into said annular chamber, said means consisting of blower means;

means for injecting air conducted from said annular chamber into said combustion chamber from a plurality of nozzles;

water supply means for supplying water into said inlet header; and steam delivery means for forwarding steam produced in said outlet header to an external user.

2. A waste burning boiler according to claim 1, wherein said air injecting means comprises a plurality of holes formed in said plate members.

3. A waste burning boiler according to claim 1, wherein said outer wall consists of a substantially cylindrical wall, and said water pipes along with said plate members define a substantially enclosed cylindrical inner wall coaxially received in said outer wall.

4. A waste burning boiler according to claim 1, wherein said exhaust outlet comprises depressurizing means for drawing exhaust gas out of said combustion chamber.

5. A waste burning boiler according to claim 4, wherein said depressurizing means comprises an ejector which is powered by a flow of pressurized air produced by said pressurized air supplying means for supplying pressurized air into said annular chamber.

6. A waste burning boiler, comprising:

a substantially enclosed outer wall;

a plurality of water pipes extending between an inlet header and an outlet header inside said outer wall in the manner of a cage having an open top and an open bottom, and defining a combustion chamber therein and an annular chamber between said water pipes and said outer wall, wherein said water pipes are arranged in a mutually spaced relationship, and the gaps between said water pipes are substantially closed by plate members;

a fuel inlet provided in said outer wall so as to communicate with said combustion chamber for charging waste material to be burnt into said combustion chamber;

an exhaust outlet provided in said outer wall for expelling exhaust gas from said combustion chamber;

an ash outlet provided in a lower part of said outer wall for removing ash from said combustion chamber;

means for supplying pressurized air into said annular chamber;

means for injecting air conductive from said annular chamber into said combustion chamber, wherein said air injecting means comprises a plurality of holes formed in said plate members;

water supply means for supplying water into said inlet header; and steam delivery means for forwarding steam produced in said outlet header to an external user.

7. A waste burning boiler, comprising:

a substantially enclosed outer wall;

a plurality of water pipes extending between an inlet header and an outlet header inside said outer wall in the manner of a cage having an open top and an open bottom, and defining a combustion chamber therein and an annular chamber between said water pipes and said outer wall, wherein said water pipes are arranged in a mutually spaced relationship, and the gaps between said water pipes are substantially closed by plate members;

a fuel inlet provided in said outer wall so as to communicate with said combustion chamber for charging waste material to be burnt into said combustion chamber;

an exhaust outlet provided in said outer wall for expelling exhaust gas from said combustion chamber;

an ash outlet provided in a lower part of said outer wall for removing ash from said combustion chamber;

means for supplying pressurized air into said annular chamber;

means for injecting air conductive from said annular chamber into said combustion chamber, wherein said air injecting means comprises a plurality of holes formed in said plate members;

water supply means for supplying water into said inlet header; and delivery means for forwarding hot water produced in said outlet header to an external user.

8. A waste burning boiler, comprising:

a substantially enclosed outer wall;

a plurality of water pipes extending between an inlet header and an outlet header inside said outer wall in the manner of a cage having an open top and an open bottom, and defining a combustion chamber therein and an annular chamber between said water pipes and said outer wall;

a fuel inlet provided in said outer wall so as to communicate with said combustion chamber for charging waste material to be burnt into said combustion chamber;

means for supplying pressurized air into said annular chamber;

means for injecting air conducted from said annular chamber into said combustion chamber from a plurality of nozzles;

an exhaust outlet provided in said outer wall for expelling exhaust gas from said combustion chamber, wherein said exhaust outlet comprises depressurizing means for drawing exhaust gas out of said combustion chamber, wherein said depressurizing means comprises an ejector which is powered by a flow of pressurized air produced by said pressurized air supplying means for supplying pressurized air into said annular chamber;

an ash outlet provided in a lower part of said outer wall for removing ash from said combustion chamber;

water supply means for supplying water into said inlet header; and steam delivery means for forwarding steam produced in said outlet header to an external user.

* * * * *